Aug. 1, 1933.                G. T. PFLEGER                1,920,318
                         SUBMERSIBLE POWER UNIT
                           Filed Feb. 3, 1930
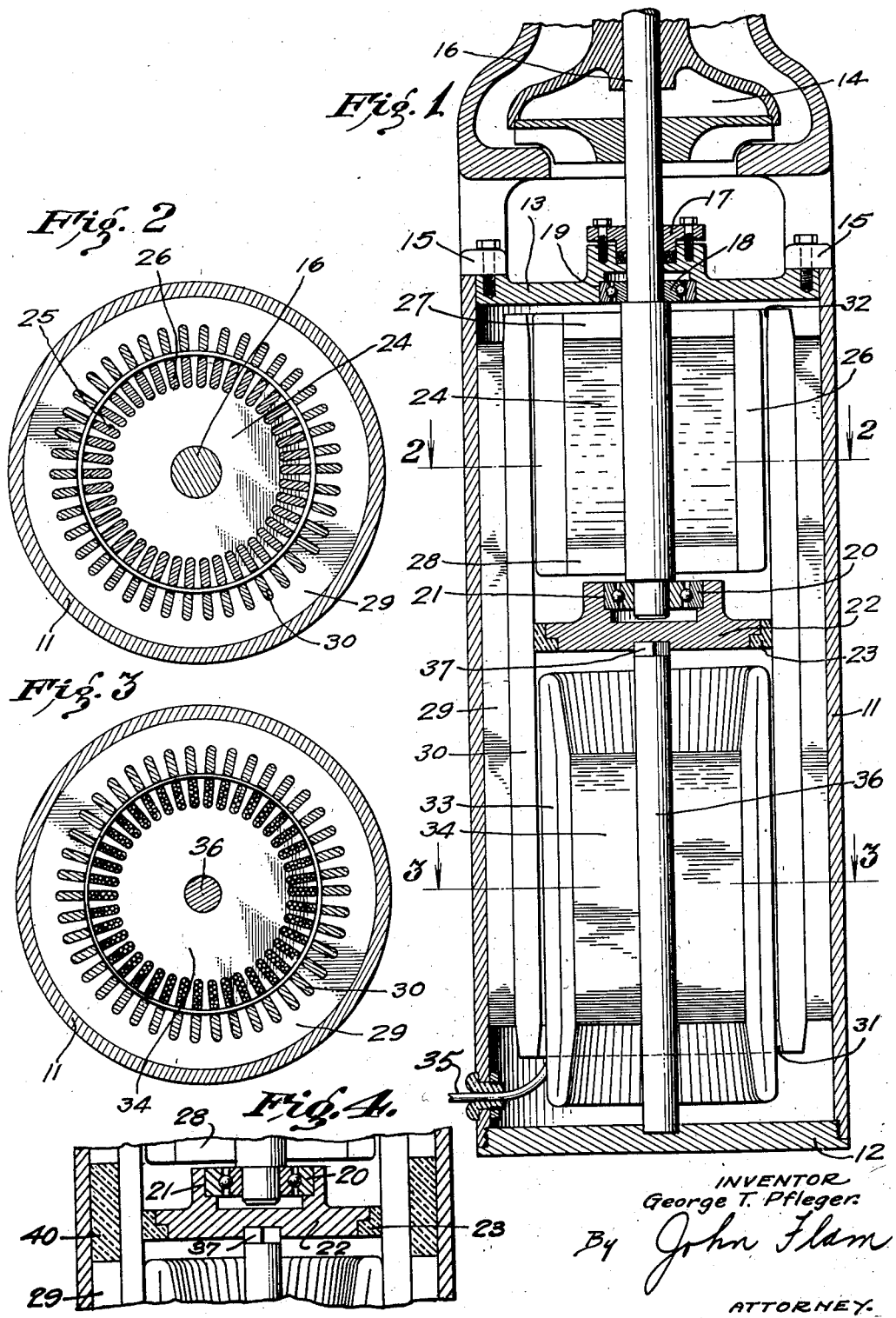
INVENTOR
George T. Pfleger
By John Flam
ATTORNEY Patented Aug. 1, 1933

1,920,318

UNITED STATES PATENT OFFICE 1,920,318

SUBMERSIBLE POWER UNIT

George T. Pfleger, Los Angeles, Calif., assignor to U. S. Electrical Manufacturing Company, Los Angeles, Calif., a Corporation of California Application February 3, 1930. Serial No. 425,537

2 Claims. (Cl. 172—280.)

This invention relates to an electric motor structure that can be used for example for driving a pump in an oil well.

It is one of the objects of my invention to provide a motor structure that can be effectively used in the well, and that can be kept insulated from the moisture in the well.

I accomplish this result by using a compact transformation polyphase system to reduce the electromotive force of the source of electrical energy to a very low value, whereby a low voltage, heavy current induction motor can be used at the place where the mechanical power is needed. Thus the economies of transmitting the power at a high voltage such as 220 or 440 volts from a source at quite a distance from the motor, are secured; while the problem of winding insulation of the motor itself is reduced, since low potential differences, such as 1 or 2 volts, can be used for the motor windings.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a longitudinal vertical section showing my power unit in a casing and as directly connected to a pump structure;

Fig. 2 is a sectional view, taken along plane 2—2 of Fig. 1;

Fig. 3 is a sectional view, taken along plane 3—3 of Fig. 1; and

Fig. 4 is a fragmentary sectional view of a modification.

I show a casing 11 of general tubular form, in which can be housed the elements of the power system. This casing has a bottom 12 and a top 13, both secured in any suitable manner to the casing 11. A pump structure 14 is diagrammatically indicated, and is shown as supported as by feet 15, on casing 11. The shaft 16 of the pump structure 14 extends into casing 11 so that power can be imparted to it from the motor structure in the casing, as will be hereinafter described. A packing gland 17 can be disposed around shaft 16 where it enters into the casing, to prevent fluid from entering into it.

The shaft 16 can be journalled in the cover 13, as by the aid of the ball bearings 18, disposed in a recess 19 in cover 13. The lower end of this shaft 16 is similarly supported in ball bearings 20 disposed in a recess 21 of a cross partition 22. The partition, if made from metal, can have an insulation ring 23 disposed around it, to insulate it from current carrying parts.

Shaft 16 carries the rotor member of a low voltage polyphase induction motor. Thus this member includes the laminations 24, in slots 25 of which are disposed the bars 26. Due to the use of a low voltage such as one or two volts, no particular concern need be paid to the insulation of the bars from the punchings. The bars 26 are all joined to form a squirrel cage, as by the end rings 27, 28.

The stator structure includes the laminations 29, held inside the casing 11, in which are disposed the bars 30. These bars, being subjected to a potential difference of only one or two volts, need not be carefully insulated from the stampings 29. The stator bars 30 are connected by end rings 31, 32 to form a squirrel cage polyphase winding.

These bars are, furthermore arranged to extend longitudinally for a considerable distance below the rotor winding. This extended part of the bars is intended to cooperate with a stationary polyphase winding 33 wound in the punchings 34. This winding 33 acts as a primary winding of a transformer, the secondary of which is formed by the bars 30. This primary is wound for the usual high voltage, which is conducted to it through a cable 35. It is furthermore, supported on a shaft 36 that is stationary and extends between the partition 22 and the bottom 12. The top 37 of shaft 36 is shown as square and as cooperating with a square socket in partition 22 to prevent rotation thereof.

Since the bars 30 cooperate only with the elements 26 and 33, that portion of the laminations 29 could be omitted, which are opposite the axial space between these two elements. A nonmagnetic, insulation spacer 40 could be introduced in lieu of such laminations, as shown for example in Fig. 4.

By suitable winding arrangement, the electromotive force impressed on winding 33 is transformed in winding 30 to a very low value such as a few volts. Due to the use of a polyphase source for coils 33, the bars 30 carry polyphase currents that set up the required rotating magnetic field for causing the rotor structure 24—26 to rotate. It is to be especially noted that the bars 30 and end rings 31, 32, form a closed winding that performs two functions—as a secondary of a transformer, and as a primary of the induction motor. The connections are short and direct, and therefore, although there is a large current flow through the bars, there is no material voltage loss. Furthermore, although a gap is shown between the cores 29 and 34 of the two stationary windings 30 and 33, this gap could be entirely eliminated as there is no relative movement, as shown for example in Fig. 4.

The partition 22 can be pressed in place inside of winding bars 30, and is held against axial movement by the parts above and below it, such as shafts 16 and 36.

Since both windings 33 and 30 are stationary, an insulation packing can be placed into the bottom of the casing 11, to prevent fluid from entering that part of the casing where the moving elements are located, and also to seal the windings 33 and 30 from fluid. For example, wax or tar can be packed into the casing, up to at least the level of partition 22. The material so used, should of course be able to withstand the temperatures attained in casing 11.

I claim:

1. In an electrical power unit for use in a well, a fluid tight, substantially cylindrical casing capable of submergence in the well, a magnetic core arranged adjacent the inner wall of the casing and enclosed therein, a short circuited low voltage winding supported on said core, a stationary high voltage inducing winding encompassed by said core and cooperating with said low voltage winding to induce a low voltage therein, a low voltage secondary winding axially spaced from the inducing winding, in cooperative relation to the short circuited winding, and encompassed by said core, and means whereby mechanical power developed by said secondary winding is rendered available exterior of the casing.

2. In an electrical power unit for use in a well, a fluid tight, substantially cylindrical casing capable of submergence in the well, a magnetic core arranged adjacent the inner wall of the casing and enclosed therein, a short circuited low voltage winding supported on said core, a stationary high voltage inducing winding, including a core encompassed by said magnetic core and supported near one end of the short circuited winding to induce a low voltage therein, a low voltage short circuited secondary winding opposite the other end of said first mentioned short circuited winding and located within the magnetic core that is adjacent the inner wall of the casing, and a rotatable shaft supporting said secondary winding and extending exteriorly of the casing.

GEORGE T. PFLEGER.